United States Patent Office 3,803,291
Patented Apr. 9, 1974

3,803,291
SULFUR DIOXIDE REMOVAL VIA
POLYMER FORMATION
Robert D. Lundberg, Somerville, N.J., assignor to Esso
Research and Engineering Company
No Drawing. Filed Apr. 4, 1972, Ser. No. 240,808
Int. Cl. C01b 17/00
U.S. Cl. 423—243       5 Claims

ABSTRACT OF THE DISCLOSURE

Sulfur dioxide is selectively removed from a gas mixture such as flue gas by contacting the gas mixture with a derivative of norbornene at a temperature of about 0° to 100° C. The resulting polymer can be thermally decomposed at temperatures above about 150° C., thereby making repeated cyclic desulfurization and regeneration possible.

BACKGROUND OF THE INVENTION

This invention relates to the removal of sulfur dioxide from waste gas streams in order to prevent air pollution.

Sulfur dioxide is a constituent of various waste gas streams, such as flue gas streams formed by combustion of sulfur-containing carbonaceous fuels in power plants. Other waste gas streams containing sulfur dioxide include tail gases from a sulfuric acid production facility.

Various processes have been suggested for the removal of sulfur dioxide from waste gases such as flue gas. These may be grouped generally into wet processes and dry processes. Wet processes are typically based on the reaction of sulfur dioxide with an aqueous scrubbing solution containing an alkali metal sulfite, ammonium sulfite, or ammonium hydroxide, as exemplified by U.S. Pats. 3,485,581; 2,233,841; and 2,405,747, respectively. Dry processes are typically based on the reaction of sulfur dioxide with an active metal oxide on a support, as described for example in British Pat. 1,089,716 and in U.S. Pat. 3,501,897; or on the reaction of sulfur dioxide with lime, as illustrated by British Pats. 435,560 and 1,183,937. All of the processes herein cited are regenerative processes; that is, the absorber effluent solution or the solid $SO_2$-reactive material is capable of restoration to substantially its original state with the liberation of a gas stream which is richer in $SO_2$ than the original waste gas stream.

This invention takes a different approach to the removal of sulfur dioxide from waste gas streams. The present process is based on the reaction of $SO_2$ with a monomer which is capable of copolymerization with sulfur dioxide.

SUMMARY OF THE INVENTION

According to this invention, sulfur dioxide is removed from a gas mixture containing the same by contacting the gas mixture with a derivative of 2-norbornene, which is also known as bicyclo[2.2.1]hept-2-ene.

DESCRIPTION OF THE PREFERRED EMBODIMENT

The norbornene derivatives which are useful as agents for selectively removing sulfur dioxide from gas mixtures according to this invention include substituted norbornenes, and substituted norbornadiene compounds. Monosubstituted norbornenes constitute a preferred class of compounds. Bis(norbornenyl) compounds, in which a pair of norbornenyl radicals are connected through a bridge, are among the useful compounds. The norbornene derivatives can also be called bicycloheptene derivatives, or BCH derivatives for short. Norbornene itself is too volatile to be suitable for the purposes of this invention.

The molecular weight of useful norbornene derivatives does not exceed 1000 times the number of norbornene groups in a molecule, and preferably does not exceed 1000 even when more than one norbornene group is present.

The norbornene derivatives have the general formula

I 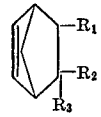

or the general Formula II:

II 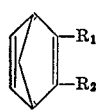

where (a) $R_1$ is an organic radical containing 1 to about 30 carbon atoms; $R_2$ and $R_3$ are hydrogen, an inorganic radical, or an organic radical containing 1 to about 20 carbon atoms; or (b) where $R_1$ is hydrogen and $R_2$ and $R_3$ together constitute a divalent organic radical containing 1 to about 30 carbon atoms.

Especially preferred compounds are those which are capable of reacting with sulfur dioxide even in the absence of an initiator. Among these compounds are:

| | |
|---|---|
| 5-carbomethoxy-2-norbornene | (I–a) |
| 5-acetoxy-2-norbornene | (I–b) |
| 5-crotyl-2-norbornene | (I–c) |
| 5-acetyl-2-norbornene | (I–d) |
| 5-acetonyl-2-norbornene | (I–e) |
| 5-benzyloxy-2-norbornene | (I–f) |
| 5-methoxy-2-norbornene | (I–g) |
| 5-ethoxy-2-norbornene | (I–h) |
| 5-methoxy methyl-2-norbornene | (I–i) |
| 5-benzyloxy methyl-2-norbornene | (I–j) |

These compounds may be represented by the general Formula I in which $R_1$ is a monovalent organic radical having an active hydrogen atom attached to a carbon atom, e.g., —COOR$_4$, —OC(:O)R$_4$, —CH$_2$CH=CH$_2$, —CH$_2$CH=CHR$_4$, —C(:O)R$_4$, —CH$_2$C(:O)R$_4$, —OR$_4$, or —CH$_2$OR$_4$, where $R_4$ is a lower alkyl radical containing 1 to about 6 carbon atoms (e.g., methyl) or an aralkyl radical containing 7 to about 12 carbon atoms (e.g., benzyl), and $R_2$ and $R_3$ are hydrogen. Other active compounds are those conforming to the general Formula I in which $R_1$ and $R_2$ are monovalent organic radicals having an active hydrogen atom attached to a carbon atom, and $R_3$ is hydrogen. Still other active compounds are the norbornadienyl analogs of the above, i.e., compounds represented by general Formula II in which $R_1$ and $R_2$ are as above defined.

A second class of suitable norbornene derivatives are those which will react with sulfur dioxide in the presence of an initiator. These compounds include:

| | |
|---|---|
| 5-hydroxymethyl-2-norbornene | (I-i) |
| 5-(2-hydroxyethyl)-2-norbornene | (I-j) |
| 5-ethylidene-2-norbornene | (I-k) |
| 5-styryl-2-norbornene | (I-l) |
| Di(2-norbornen-5-yl) suberate | (I-m) |
| 5-hydroxy-2-norbornene | (I-n) |
| 5-(1-hydroxyethyl)-2-norbornene | (I-o) |
| 5-(2-hydroxypropyl)-2-norbornene | (I-p) |
| 5-(1-hydroxypropyl)-2-norbornene | (I-q) |
| 5-hydroxybenzyl-2-norbornene | (I-r) |

Also, Compounds I-a through I-h can also be reacted with sulfur dioxide in the presence of an initiator; in fact, the presence of an initiator usually enhances the activity of these compounds.

Chloro, bromo, nitro and hydroxy analogs of the above compounds, in which the inorganic substituent is attached to either the 5- or the -6 position of the norbornene nucleus may also be used.

Not all norbornene derivatives (including some compounds conforming to the general Formula I or II) are suitable. For example, 5-carboxy-2-norbornene (I-s) and dicyclopentadiene (I-t) were tested and found not to be suitable. Generally, sulfonic and carboxylic acids in which the acid group is neither neutralized nor esterified, and primary and secondary amines (but not tertiary amines) should be avoided. Also, norbornene and norbornadiene are too volatile to be suitable.

The norbornene derivatives can be prepared by the reaction of a conjugated diene such as 1,3-cyclopentadiene (III) with a dienophile according to conventional Diels-Alder reaction techniques. The dienophile is either an ethylenically unsaturated Compound (IV) or anacetylenically unsaturated Compound (V), depending on whether a compound conforming to General Formula I or the General Formula II is desired. The desired norbornene compounds can generally be prepared according to the equations:

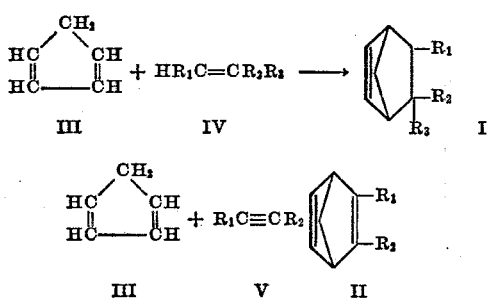

There are some derivatives that are best prepared by first preparing a precursor (which is also a norbornene derivative) according to the above equation and then subsequently modifying the precursor. For example, the reaction of cyclopentadiene and acrylic acid is used to prepare 5-carboxy-2-norbornene, which can then be reacted with methyl alcohol to yield 5-carbomethoxy-2-norbornene (I-a). In some cases, there can be functional groups attached to the dieneophile which inhibit the reaction and lower the yield. However, those problems are well known in the art, and nearly any type of substituted norbornene derivative can be prepared by using the indicated reaction combined with other well known methods of organic chemistry.

Gas mixtures containing $SO_2$ which can be desulfurized according to this invention include flue gases obtained by combustion of fossil fuels (e.g., electric power plant stack gas), tail gases from Claus plants and from sulfuric acid plants, smelter gases, and the like. The gas mixture may be either oxidizing or nonoxidizing. The $SO_2$ content may range from about 0.1% to about 30% by volume; thus, the $SO_2$ is present in minor amounts. In the case of flue gas, the $SO_2$ content is generally about 0.1–0.5% by volume, typically about 0.2–0.3% by volume.

The gas mixture is contacted with the norbornene derivative at a temperature of about 0° C. to about 100° C., preferably about 10° C. to about 75° C. Generally, lower temperatures favor more complete sulfur dioxide removal than do higher temperatures.

Contact between the gas mixture and the norbornene derivative can be made by either of two general methods. The first is to pass the gas mixture through a reactor containing a fixed bed of the norbornene derivative on a solid support, which is preferably inert to the constituents of the gas mixture. Glass wool is a suitable support. Low surface area supports, i.e., supports having a surface area less than about 50 square meters per gram and having little or no internal pore structure, are preferred.

Other supports which can be used include silica, alumina and carbon black. The purpose of the support is to provide a suitable surface area of the norbornene derivative for optimum contact. Supports which have little or no internal pore structure are preferred. If there is substantial internal pore structure, rapid and complete contact with the flue gas is impeded, and the regeneration reaction is also hampered.

While these supports are employed only as inactive substrates in this invention, it is readily apparent that a derivative of norbornene could be reacted with a suitable support. For example, highly basic glass wool could be coated with a carboxylic acid derivative of norbornene and thereby create a strong ionic interaction between the derivative and the substrate. While this is not a preferred form of this invention, it is one which can be considered as within the scope of this process.

The second general method is to scrub the gas mixture with the norbornene derivative, either in bulk or in solution in a suitable liquid solvent. Inert solvents (i.e., those that do not react with $SO_2$ or with other constituents of the gas mixture) are preferred; especially desirable are solvents such as dibutyl phthalate, dioctyl phthalate, ditridecylphthalate, paraffinic oils, oils based on paraffinic, aromatic and naphthenic hydrocarbons, liquid low molecular weight polymers (under 2000 in molecular weight) derived from isobutylene, etc. A number of oils are commercially available at very low costs which meet these criteria, and they are especially preferred.

Removal of sulfur dioxide takes place with formation of a polymer according to the following equation:

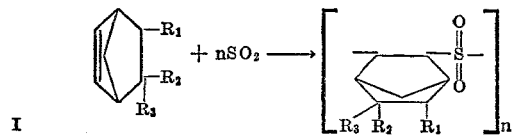

The formation of polymer of the above type is described in U.S. Pat. No. 3,313,785.

Norbornadiene derivatives (II) react similarly with one mole of sulfur dioxide per mole of norbornadiene at temperatures of about 0° to about 100° C. (Thermally stable copolymers are formed at higher temperatures by reaction of two moles of sulfur dioxide with one mole of norbornadiene, according to U.S. Pat. 3,290,272. These copolymers are not suitable for the present invention).

Polymerization according to the above reaction proceeds by free radical mechanism. Polymerization can proceed in the absence of an initiator when a more active norbornene derivative is used, and when the temperature is not above about 50° C. At higher temperatures, and when a less active norbornene derivative is used, a small amount (i.e., about .0001 to about 5% by weight, based on norbornene derivative) of a free radical initiator may be required. Known free radical polymerization initiators, e.g., organic peroxides, nitriles, azo compounds, etc., can be used. Suitable initiators include tert.-butyl hydroperoxide, cumene hydroperoxide, di-isopropylbenzene peroxide, 4-menthane hydroperoxide, benzoyl peroxide, and azobis(isobutyronitrile).

The polymers formed in the practice of this invention can be thermally decomposed at temperatures of about 150° C. to about 260° C., especially from about 160° C. to about 230° C. This permits regeneration of the original norbornene derivative. Repeated cyclic operation is therefore possible.

There are a number of methods by which this regeneration process can be made more facile. The use of free radical polymerization initiators can be employed in this depolymerization process just as in the polymerization process, since they aid the reverse reaction in a similar manner. The use of such initiators permits the regeneration process to proceed more rapidly at a lower temperature which is desirable from an economics viewpoint. Of course, such initiators are not necessary, and in some cases will be formed in situ, with the norbornene derivative in presence of small amounts of air.

It is desirable to maintain the regeneration temperature below 260° C. and preferably below 230° C. in order that degradation of the norbornene derivative be avoided. At very high temperatures these materials can be oxidized or irreversibly changed which would increase the cost of employing this invention. Normally this will not be a problem because regeneration is usually facile at temperatures of about 150° to 200° C.

In a typical fixed bed operation according to this invention, the gas mixture containing $SO_2$ is passed through a fixed bed of supported norbornene derivative until the effluent $SO_2$ concentration reaches an unacceptably high level. Then the flow of gas mixture is stopped and the norbornene derivative is regenerated by passing a hot inert gas, such as nitrogen, at an inlet temperature of at least 150° C., through the bed. Initiator can be added where required prior to the start of a desulfurization cycle.

In a typical scrubbing operation according to this invention, the norbornene derivative is continuously introduced into a scrubber (i.e., a vertical tower) in contact with the gas mixture, and the effluent containing the polymer is removed from the scrubbing zone. Countercurrent contact is preferred. Then the effluent is heated to above 150° C., sulfur dioxide is evolved, and the regenerated norbornene derivative is returned to the scrubber.

The present process achieves a high degree of $SO_2$ removal, in some cases nearly quantitative, from gas mixtures such as flue gas at ordinary temperatures.

Another application for the process of this invention is in sulfur dioxide detection. It has been observed that piezoelectric quartz crystal resonators can be employed as very sensitive mass detectors. When such devices are coated with a suitable reactive coating and exposed to an air pollutant which reacts with the coating, an immediate change in mass alters the frequency of the coated crystal which can be detected extremely accurately (Reference: W. H. King, Research/Development, April 1969, No. 4, p. 28–34; Ibid, May 1969, No. 5, p. 28–33). The success of such a device in detecting $SO_2$ contents will be dependent on a rapid and complete reaction of the crystal coating with $SO_2$ at low levels and ambient conditions. There are very few coatings (if any) which will react quantitatively, rapidly, and selectively with $SO_2$. Minute amounts of $SO_2$ can be detected in a very convenient manner according to this invention by contacting a gas mixture with a detector comprising a piezoelectric crystal having a coating comprising a norbornene derivative as described herein.

This invention will now be described further with respect to the specific examples which follow.

EXAMPLE 1

A series of experiments was carried out to determine the effectiveness of 5-carbomethoxy-2 norbornene (I–a) as a material for removing sulfur dioxide from gas mixtures. The effects of temperature and variations in the percentage of $SO_2$ in the synthetic flue gas were also studied.

The norbornene derivative was coated on a previously weighed pad of glass wool, averaging about 1.1±0.2 grams in weight in most cases, by soaking the wool in a solution of the compound in cyclopentane and drying in a vacuum over or by adding the compound directly to the wool with an eye dropper. The coated glass wool pad was weighed and placed in a vertical pyrex tube reactor, 150 mm. in length and one inch in diameter. The weights of both the glass wool and the norbornene derivative coating were recorded. Following an initial flow period of nitrogen at 40 cc./min., synthetic flue gas containing various measured percentages of $SO_2$ in nitrogen ranging from 0.33% to 10% $SO_2$ by volume was passed through the reactor tube at a rate of 40 cc./min. for the time indicated in Table I and at room temperature (25° C.) except where otherwise noted. (A mixture of $SO_2$ in air was used in Run 12). To obtain the required percentage $SO_2$ in the synthetic flue gas, a measured flow volume of $SO_2$ from a cylinder of anhydrous $SO_2$ was mixed with a measured flow volume of nitrogen by means of rotameters calibrated by water volume displacement. After the $SO_2$ removal experiments were completed, nitrogen was then passed through the reactor at the same flow rate for 5 minutes to flush unreacted $SO_2$ from the reactor and the glass wool pad. At recorded time intervals during the nitrogen, $SO_2$-nitrogen and nitrogen flush flows, the glass wool pad was removed from the reactor, weighed and the change in weight corresponding to $SO_2$ absorption recorded. The weight gains at the end of synthetic flue gas flow and after nitrogen flush are recorded in Table I as "weight increase" and as "Retained weight," respectively. A control for each experiment was performed using the same weight of glass wool and coating of norbornene derivative, flowing only nitrogen through the reactor and recording any weight changes at timed intervals as with the $SO_2$—$N_2$ experiment. In this manner, a correction value for volatilized norbornene derivative was determined. In most cases, this was a very small correction. Pressure drops in these experiments were approximately 0.1 inch of water or less.

Sulfur analyses of the products on glass wool after the final nitrogen flush in each run were obtained to determine the presence and relative amount of sulfur retained. Sulfur analyses were consistent within the limits of experimental error in the "retained weight" measurements, assuming that "retained weight" is due to chemically combined $SO_2$. Less than one mole of $SO_2$ was removed for each mole of norbornene derivative present, as may be ascertained from the "retained weight" and "starting compound weight" values in Table I.

In the course of these experiments the formation of a white hard solid on the glass wool pads was observed after sufficient $SO_2$ had reacted. This solid was shown to be a copolymer of $SO_2$ by sulfur analysis.

Results are given in Table I below.

The apparatus was flushed with nitrogen prior to each

TABLE I

| Run No. | Starting compound wt., grams | Temp., °C. | Percent $SO_2$ stream | Time, min. | Wt.[1] increase, grams | Retained[1] wt., grams | Percent retained,[2] wt. | Wt. percent S analysis[3] |
|---|---|---|---|---|---|---|---|---|
| 1 | 1.0075 | 25 | 3.3 | 132 | 0.0693 | 0.0534 | 5.3 | 0.79 |
| 2 | 0.538 | 25 | 3.3 | 218 | 0.0583 | 0.0316 | 5.9 | 0.30 |
| 3 | 1.204 | 25 | 3.3 | 180 | 0.0887 | 0.0680 | 5.6 | 1.43 |
| 4 | 0.4471 | 25 | 3.3 | 180 | 0.0379 | 0.0320 | 7.2 | 1.51 |
| 5 | 1.6159 | 25 | 3.3 | 180 | 0.2200 | 0.2012 | 12.5 | 3.80 |
| 6 | 2.4590 | 25 | 3.3 | 241 | 0.4166 | 0.3922 | 15.9 | 3.86 |
| 7 | 1.2732 | 25 | 3.3 | 184 | 0.1388 | 0.1270 | 10.0 | |
| 8 | 1.1864 | 35 | 1.0 | 195 | 0.0582 | 0.0557 | 4.7 | |
| 9 | 1.0210 | 25 | 10 | 138 | 0.182 | 0.176 | 17.2 | 10.70 |
| 10 | 0.6721 | 25 | 3.3 | 454 | 0.115 | 0.115 | 17.1 | |
| 11 | 1.0263 | 25 | 0.33 | 4,220 | 0.6 | 0.6 | 58 | 2.17 |
| 12 | 0.8580 | 25 | [4]3.3 | 1,383 | 0.26 | 0.26 | 30.3 | 5.61 |
| 13 | 0.6379 | 90–95 | 3.3 | 60 | .07 | .07 | 11 | 0.44 |
| 14 | 0.9447 | 70–45 | 3.3 | 115 | 0.212 | 0.212 | 22.4 | 2.87 |

[1] Corrected for volatilized unreacted norbornene derivative.

[2] Percent retained weight = $\dfrac{\text{Retained weight}}{\text{starting compound wt.}} \times 100$.

[3] Wt. percent S = $\dfrac{\text{Grams of sulfur}}{\text{wt. of glass wool plus starting compound wt.}}$.

[4] In air.

While the results of Example 1 clearly demonstrate that the norbornene compounds will remove $SO_2$ at relatively high contents (0.33 to 10% by volume in nitrogen), an alternate procedure is required to demonstrate $SO_2$ removal at very low $SO_2$ contents. For such experiments measurements of weight increase are not sufficiently sensitive. Therefore, a procedure was employed wherein the effluent stream was monitored for contents of $SO_2$ after contacting the norbornene compound. This latter technique is much more sensitive to minute changes in $SO_2$ level.

EXAMPLE 2

A series of experiments was carried out to demonstrate the effectiveness of various derivatives of norbornene as materials for removing sulfur dioxide from gas mixtures. The effects of temperature and of added polymerization initiator were also studied.

Synthetic flue gas containing 2,691 p.p.m. of $SO_2$, balance nitrogen, was passed at a flow rate of 100 cc./min. from a compressed gas cylinder through the tubular reactor described in Example 1. This reactor contained fine glass wool packing having a surface coating of the norbornene derivative being tested. The glass wool was coated as described in Example 1. The weight of both the glass wool and the norbornene derivative were recorded. Effluent gas of reduced $SO_2$ content flowed from the reactor to an $SO_2$ analyzer which was connected to a continuous recorder. The $SO_2$ analyzer was Model No. NS–200A, made by Environ Metrics, Inc. of Marina Del Rey, California. The effluent gas was vented from the analyzer to a laboratory hood. The desired gas flow rate was maintained by means of a needle valve and a flow meter, both located in an exit line attached to the cylinder outlet.

test. Also, prior to each test, the norbornene derivative to be tested was added to the glass wool with a medicine dropper. The analyzer was calibrated to 100% full scale (i.e. full scale equals 2691 p.p.m. of $SO_2$) prior to each test. To permit equilibrium, the $SO_2$ in the effluent stream is the indicated level after about 6 minutes of contact of the $SO_2/N_2$ gas stream with the norbornene derivative.

In some experiments, a small amount of a polymerization initiator was mixed with the test compound.

Data and results are shown in Table II below.

TABLE II

| Test No. | Test compound Name | Formula | Amount, grams | Temp., °C. | Initiator Compound | Amount, grams | Effluent $SO_2$, p.p.m. |
|---|---|---|---|---|---|---|---|
| 1 | None | None | | 25 | | | 2,691 |
| 2 | 5-carbomethoxy-2-norbornene | I-a | 0.7511 | 25 | | | 928 |
| 3 | do | I-a | 0.9152 | 25 | | | 835 |
| 4 | 5-acetoxy-2-norbornene | I-b | 0.7267 | 25 | | | 1,480 |
| 5 | 5-crotyl-2-norbornene | I-c | 0.737 | 25 | | | 1,505 |
| 6 | 5-acetonyl-2-norbornene | I-e | 0.864 | 25 | | | 2,475 |
| 7 | 5-methoxy methyl-2-norbornene | I-i | 1.013 | 25 | | | 2,570 |
| 8 | do | I-i | 1.1144 | 50 | | | 2,530 |
| 9 | 5-carboxy-2-norbornene (endo-exo mixture) | I-s | 1.009 | 25 | | | 2,598 |
| 10 | Di(2-norbornen-5-yl) suberate | I-m | 0.9816 | 25 | | | 2,640 |
| 11 | 5-carboxy-2-norbornene (endo) | I-s | 0.999 | 25 | | | 2,640 |
| 12 | Dicyclopentadiene | I-t | 0.974 | 25 | | | 2,690 |
| 13 | 5-carbomethoxy-2-norbornene | I-a | 0.924 | 25 | t-Butyl hydroperoxide | 0.010 | 323 |
| 14 | 5-carbomethoxy-2-norbornene | I-a | 0.5065 | 25 | Di-tertiary butyl peroxide | 0.0066 | 1,075 |
| 15 | 5-methoxy methyl-2-norbornene | I-i | 1.0159 | 25 | t-Butyl hydroperoxide | 0.0129 | 767 |
| 16 | do | I-i | 1.0209 | 25 | Cumene hydroperoxide | 0.0132 | 915 |
| 17 | do | I-i | 1.1137 | 50 | t-Butyl hydroperoxide | 0.0117 | 336 |
| 18 | 5-ethylidene-2-norbornene | I-k | 0.9782 | 25 | do | 0.01 | 1,790 |
| 19 | 5-carboxy-2-norbornene (endo) | I-s | 1.0046 | 25 | do | 0.0151 | 2,475 |

EXAMPLE 3

This example demonstrates the removal of $SO_2$ at low levels by scrubbing a synthetic flue gas with 5-carbomethoxy-2-norbornene (I–a) derivative.

An experimental set-up similar to that of Example 2 was employed. A synthetic flue gas of 2691 p.p.m. $SO_2$ in nitrogen was used. The cylinder containing this gas mixture was connected by means of flexible tubing through a rotameter to an $SO_2$ removal vessel containing about 30 ml. of liquid 5-carbomethoxy-2-norbornene (I–a). The $SO_2$ removal vessel was a glass vacuum trap consisting of an outer tube having a diameter of about 28 mm. and a length of 200 mm., and an inner tube about 10 mm. and a diameter and having a cylindrical fritted glass tip about 2 cm. long so that a good dispersion of the gas mixture could be distributed below the surface of the liquid contained in the outer tube. To obtain an intimate mixture, sufficient liquid was present so that the fritted glass tip was at least 1 cm. below the surface of the liquid. (This device was similar to that described in chemical supply catalogs such as Ace Scientific Supply Co., p. 419, pub. 1970.)

The exit tube of the $SO_2$ removal vessel was connected by flexible tubing to an Environ Metrics Analyzer. The analyzer was connected to a strip chart recorder so that after calibration the $SO_2$ level in the effluent gas could be determined either by reading the meter on the analyzer or by observing the strip chart recorder.

For calibration purposes the $SO_2$-nitrogen stream was connected directly to the analyzer from the rotameter and the analyzer calibrated. The $SO_2$-nitrogen gas mixture was then redirected through the $SO_2$ removal vessel at a flow rate of 150 ml./min. This directed a dispersion of small bubbles through the 5-carbomethoxy-2-norbornene and then through the tubing and into the analyzer. After 1 to 2 minutes flow required to equilibrate the system and to purge the tubing, the $SO_2$ levels observed with the analyzer diminished sharply. At room temperature (25° C.±3° C.) no detectable $SO_2$ was observed in the exit stream. Considering the sensitivity of this instrument, less than 10 p.p.m. $SO_2$ was present in the effluent stream. Therefore, more than 99% of the $SO_2$ was removed.

EXAMPLE 4

This experiment demonstrates the regeneration of $SO_2$ at elevated temperatures by heating a copolymer of $SO_2$ and 5-carbomethoxy-2-norbornene (I-a) to a temperature in excess of 125° C.

The experimental set-up described in Example 2 was employed except the $SO_2$ removal vessel was replaced by a straight glass tube about 15 cm. in length and 2.5 cm. in diameter. This tube was connected on one end to the $SO_2$-nitrogen gas cylinder through a rotameter to monitor gas flow rates. The other end was connected by means of flexible tubing to the $SO_2$ analyzer. The interior of the glass tube contained glass wool coated with 2.89 g. of reaction product formed by reacting 2.50 g. of 5-carbomethoxy-2-norbornene (I-a) with 0.39 g. of $SO_2$ according to the procedure described in Example 1.

The glass tube and contents were heated to elevated temperatures by means of heating tape wrapped about the tube and connected by means of a Variac to an electrical source. Temperature was monitored by means of a thermocouple suspended near the effluent gas. The temperature was maintained at 160° C.±5° C.

Pure nitrogen was conducted through the sample chamber at a flow rate of 64 ml. per min. Under these conditions after allowing several minutes to equilibration, a level of $SO_2$ content in the effluent stream of 7800 p.p.m. was observed.

The passage of pure nitrogen through the sample chamber at room temperature resulted in no evidence of $SO_2$ in the effluent stream. Therefore, the thermal regeneration of $SO_2$ was demonstrated.

It should be emphasized that temperatures in excess of 125° C. and up to about 260° C. can be employed to regenerate the $SO_2$. However, rapid regeneration of $SO_2$ is feasible only at temperatures in excess of 150° C. In order to avoid chemical decomposition of the bicycloheptenyl structure preferred regeneration temperatures are on the order of 150 to 230° C.

What is claimed is:

1. A process for removing sulfur dioxide from a gas mixture containing a minor amount of the same, which comprises contacting said gas mixture at a temperature of about 0° to about 100° C. with a substituted norbornene or substituted norbornadiene compound having at least one organic substituent group, thereby obtaining an effluent gas mixture of reduced sulfur dioxide content, and thermally regenerating said substituted norbornene or substituted norbornadiene compound at temperatures of about 150° C. to about 260° C.

2. A process according to claim 1 in which said substituted norbornene compound is 5-carbomethoxy-2-norbornene.

3. A process according to claim 1 in which said gas mixture is a flue gas.

4. A process according to claim 1 in which said substituted norbornene or substituted norbornadiene compound is copolymerized with said sulfur dioxide in the presence of a small amount of an added free radical initiator.

5. The process of claim 1 in which said gas mixture contains no more than about 0.5% by volume of sulfur dioxide.

References Cited

UNITED STATES PATENTS 3,313,785    4/1967    Zutty _____ 260—79.3 A

G. A. HELLER, Assistant Examiner

OSCAR R. VERTIZ, Primary Examiner